(12) United States Patent
Coene et al.

(10) Patent No.: US 9,117,310 B2
(45) Date of Patent: Aug. 25, 2015

(54) VIRTUAL CAMERA SYSTEM

(75) Inventors: Paul Coene, Grobbendonk (BE); Johan De Geyter, Duisburg (BE); Eddy De Greef, Erps-Kwerps (BE); Bert Geelen, Heverlee (BE); Bart Masschelein, Leuven (BE); Geert Vanmeerbeeck, Keerbergen (BE); Wilfried Verachtert, Keerbergen (BE)

(73) Assignee: IMEC, Leuven (BE)

( * ) Notice: Subject to any disclaimer, the term of this patent is extended or adjusted under 35 U.S.C. 154(b) by 292 days.

(21) Appl. No.: 13/638,969

(22) PCT Filed: Apr. 1, 2011

(86) PCT No.: PCT/EP2011/055114
§ 371 (c)(1),
(2), (4) Date: Oct. 2, 2012

(87) PCT Pub. No.: WO2011/121117
PCT Pub. Date: Oct. 6, 2011

(65) Prior Publication Data
US 2013/0016097 A1 Jan. 17, 2013

Related U.S. Application Data

(60) Provisional application No. 61/341,692, filed on Apr. 2, 2010, provisional application No. 61/428,169, filed on Dec. 29, 2010.

(51) Int. Cl.
G06T 15/20 (2011.01)

(52) U.S. Cl.
CPC ..... *G06T 15/205* (2013.01); *G06T 2207/20144* (2013.01); *G06T 2207/30221* (2013.01)

(58) Field of Classification Search
CPC .................................................. G06T 15/205
See application file for complete search history.

(56) References Cited

U.S. PATENT DOCUMENTS

2007/0273765 A1* 11/2007 Wang et al. .................. 348/152
2007/0285575 A1* 12/2007 Gloudemans et al. ........ 348/587
2009/0315978 A1* 12/2009 Wurmlin et al. ............... 348/43

OTHER PUBLICATIONS

Li et al., "Hardware-Accelerated Rendering of Photo Hulls," 2004, Eurographics, vol. 23 (2004), No. 3.*

(Continued)

*Primary Examiner* — Kee M Tung
*Assistant Examiner* — Ryan D McCulley
(74) *Attorney, Agent, or Firm* — McDonnell Boehnen Hulbert & Berghoff LLP

(57) ABSTRACT

A virtual camera system comprises a plurality of physical cameras and a hardware setup miming software to create virtual viewpoints for the virtual camera system. The position of the physical cameras is constrained, where the main constraint is the overlap between the physical cameras. The present invention provides a method for creating a virtual viewpoint of a plurality of images captured by the plurality of cameras, the images comprising current frames and previous frames. The method comprises creating background frames by combining a set of previous frames; creating a plurality of foreground masks by performing segmentation on the plurality of current frames, the segmentation comprising separating foreground objects from background objects using the created background frames; extracting the foreground objects by AND-ing the plurality of current frames with the created plurality of foreground masks; rendering the foreground objects by using a three dimensional depth-box constrained viewpoint interpolation algorithm on the plurality of current frames, the three dimensional depth box being constructed for each foreground object by exploiting information from the created foreground masks and positioning information of the foreground objects; rendering a view-dependent background image by performing homographic transformations on the created background frames; and creating the virtual viewpoint by superimposing the rendered foreground objects on the rendered background frame.

16 Claims, 11 Drawing Sheets

(56) References Cited

OTHER PUBLICATIONS

PCT Search Report and Written Opinion, PCT International Application No. PCT/EP2011/055114 dated Aug. 2, 2011.
Brown, Duane C., "Decentering Distortion of Lenses", Photogrammetric Engineering, vol. 7, 1966, pp. 444-462.
Wikipedia, "Pinhole Camera", http://en.wikipedia.org/wiki/Pinhole_camera_model, pp. 1-7.
Inamoto, Naho et al., "Intermediate View Generation of Soccer Scene from Multiple Views", Pattern Recognition 2002 Proceedings, 16th International Conference, Aug. 11-15, 2002, pp. 713-716.
Doutre, Colin et al., "Color Correction Preprocessing For Multiview Video Coding", Panos Nasiopoulos, IEEE Trans on Circuits and Systems for Video Technology, vol. 19, No. 9, Sep. 2009, pp. 6 pages.
Dumont, Maarten et al., "A Prototype for Practical Eye-Gaze Corrected Video Chat on Graphics Hardware", International Conference on Signal Processing and Multimedia Applications, 2008, pp. 236-243.
Kimura, Kenji et al., "Video Synthesis at Tennis Player Viewpoint from Multiple View Videos", IEEE Virtual Reality, Mar. 12-16, 2005, pp. 281-282.
Park, Sung Cheol et al., "Super-Resolution Image Reconstruction: A Technical Overview", IEEE Signal Processing Magazine, vol. 20, No. 3, May 1, 2003, pp. 21-36.
Geys, Indra et al., "Hierarchical Coarse to Fine Depth Estimation for Realistic View Interpolation", Proceedings of the Fifth International Conference on 3-D Digital Imagining and Modeling, Jun. 13-16, 2005, pp. 237-244.
Yang, R. et al., "Real-Time Consensus-Based Scene Reconstruction Using Commodity Graphics Hardware", 10th Pacific Conference on Computer Graphics and Applications, Oct. 9-11, 2002, pp. 225-234.

* cited by examiner

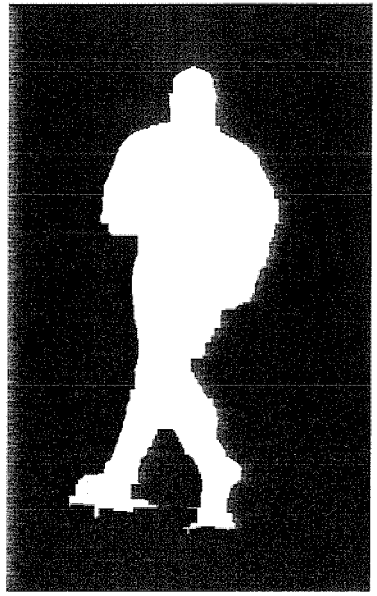
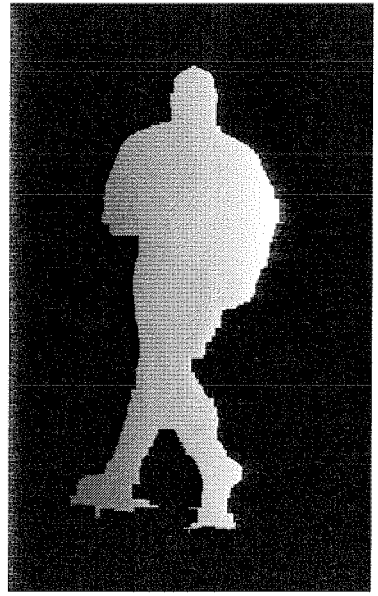
FIG. 18          FIG. 19
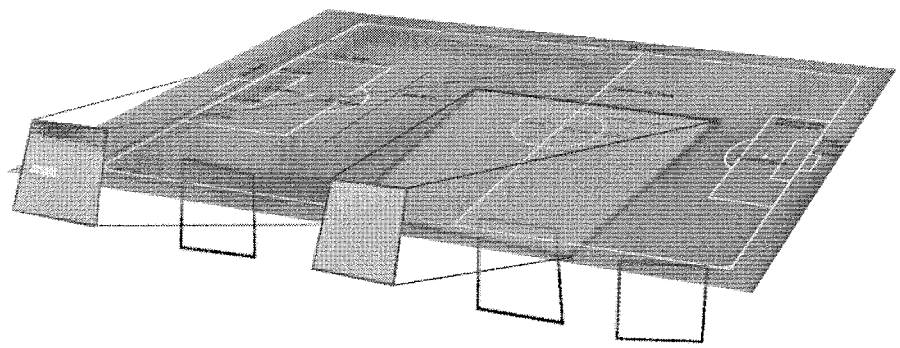
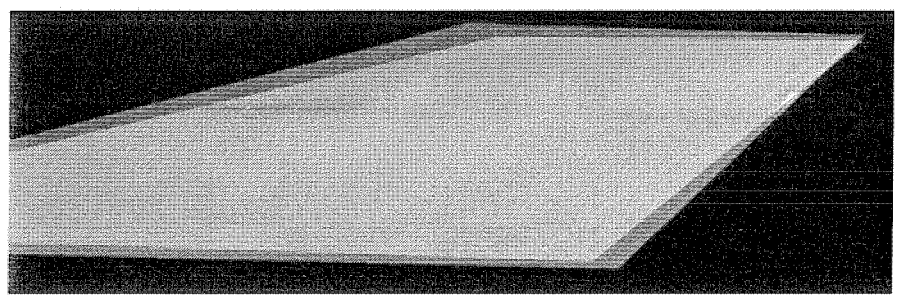
FIG. 20

VIRTUAL CAMERA SYSTEM

CROSS-REFERENCE TO RELATED APPLICATIONS

The present application is a U.S. national stage application of International Patent Application No. PCT/EP/2011/055114 filed Apr. 1, 2011, which claims priority to U.S. Provisional Application No. 61/341,692 filed on Apr. 2, 2010 and U.S. Provisional Application No. 61/428,169 filed on Dec. 29, 2010.

FIELD OF THE INVENTION

The present invention relates to image processing techniques in relation to a multi-camera setup. More specifically, the present invention relates to multi-camera systems. The system creates a virtual camera using a plurality of physical cameras. The virtual camera behaves exactly as a physical camera and can be located and moved along a path impossible for the physical cameras.

BACKGROUND OF THE INVENTION

Inamoto et al. describe in "Intermediate view generation of soccer scene from multiple videos", IEEE 2002, a method for generating an intermediate view of a soccer scene taken by multiple video cameras. In the method described, the soccer scene is classified into dynamic regions, a field region, and a background region. Using epipolar geometry in the first region and homography in the second one, dense correspondence is obtained to interpolate views. For the third region, partial area images are extracted from the panoramic image compounded from the background of multiple views. Finally synthesizing them completes intermediate view images of the whole object. By applying this method to actual scenes of a soccer match captured at the stadium, Inamoto et al. succeeded in generating natural intermediate view videos.

SUMMARY OF THE INVENTION

It is an object of embodiments of the present invention to provide a virtual camera system to create a virtual camera based on a plurality of physical cameras, wherein the virtual camera can behave exactly as a physical camera.

The above objective is accomplished by a method and device according to the present invention.

It is an advantage of a virtual camera system according to embodiments of the present invention that the virtual camera can be located and moved along a path in ways impossible for a physical camera, e.g. it is possible to put the virtual camera in the scene of interest in a non-intrusive way.

A virtual camera system according to embodiments of the present invention comprises a plurality of physical cameras and a hardware setup running software to create virtual viewpoints for the virtual camera system. The position of the physical cameras is constrained, where the main constraint is the overlap between the physical cameras.

In order to extract meaningful geometrical information about the scene, like the positioning of the objects in the scene and the geometry of the background, the physical cameras may go through a calibration process. Calibration may happen in two passes. In a first pass, an intrinsic calibration may be performed on every physical camera. The outcome of the intrinsic calibration may be a set of parameters, intrinsic parameters, for each camera describing for example some characteristics of the lens system, such as distortion and focal length. In a second pass, an extrinsic calibration may be performed. This may result in knowledge about how the physical cameras are located in the physical world.

The virtual camera system may be controlled using a hardware control panel for real-time control or using a graphical user interface. The parameters that can be controlled may be similar to a boom camera, meaning that one can steer the movement of the camera by means of pan, tilt, zoom, boom and tracking parameters, amongst others.

The interpolation process may comprise several processing steps. The actual viewpoint interpolation for the virtual camera position may be preceded by two preprocessing steps. These steps are color calibration and image undistortion. In the color calibration step, the input images are altered to match better their photometric information. This facilitates the pixel matching in a plane sweeping process. Mathematically, the plane sweeping process works on idealized images from a pinhole camera. Therefore, the input images are preferably undistorted, for example by using the intrinsic parameters derived in the calibration step.

The first step in the viewpoint interpolation process is segmentation of the input images, where foreground objects are separated from the image, for example using background subtraction. The construction of the background images may happen iteratively, meaning that they are updated with every new set of input images. Hereby it is ensured that change of intensity, for instance due to moving clouds in front of the sun, does not influence the segmentation step. The result of the segmentation step is a set of masks with foreground objects, one for each camera.

The above mentioned masks play a role in two parts in the creation of virtual viewpoints: first, they may be used to determine the location of the foreground objects in 3D space, e.g. where they are exactly located in the scene; secondly, they may be used to confine the area where the plane sweeping process looks for information. For the positioning, two methods may be used: a zero-Z approach, where it is assumed that objects are always located on the scenes' floor level, and the space carving method, which is more accurate than the first method, as there is no dependency on the vertical position of objects. Temporal tracking may be added in order to make the system more robust.

At the core of the viewpoint interpolation is the depth-box constrained plane sweeping algorithm. Depth boxes confine the area in 3D space where viewpoint interpolation is performed. These boxes are constructed based on the tracking information described above. Several methods are implemented to steer the plane sweep process for optimal interpolation. These include several pixel composers and gradient masks, amongst others. The implemented system can also be used for super resolution.

The plane sweep process only renders the foreground objects. The background is rendered using homographic transformations of the background images, where image segments are warped to their correct 3D location. This is similar to the mesh based rendering used in 3D graphic pipelines.

Using the acquired information from tracking and background reconstruction allows for the implementation of additional features. Examples of these features are telestrating (player marking, offside lines, running trail), game statistics (running speed) and digital signage.

The virtual camera system produces an HD video signal (e.g. 1080p or 720p) as output. It can be integrated directly into the broadcast path of existing equipment.

The above-described method embodiments of the present invention may be implemented in a processing system. One configuration of such processing system includes at least one programmable processor coupled to a memory subsystem that includes at least one form of memory, e.g., RAM, ROM, and so forth. It is to be noted that the processor or processors may be a general purpose, or a special purpose processor, and may be for inclusion in a device, e.g., a chip that has other components that perform other functions. Thus, one or more aspects of the present invention can be implemented in digital electronic circuitry, or in computer hardware, firmware, software, or in combinations of them. The processing system may include a storage subsystem that has at least one disk drive and/or CD-ROM drive and/or DVD drive. In some implementations, a display system, a keyboard, and a pointing device may be included as part of a user interface subsystem to provide for a user to manually input information. Ports for inputting and outputting data also may be included. More elements such as network connections, interfaces to various devices, and so forth, may be included. The various elements of the processing system may be coupled in various ways, including via a bus subsystem which may be a single bus, or a system of at least one bus. The memory of the memory subsystem may at some time hold part or all of a set of instructions that when executed on the processing system implement the steps of the method embodiments described herein. Thus, while a general processing system is prior art, a system that includes the instructions to implement aspects of the methods for creating a virtual viewpoint of a plurality of images captured by a plurality of physical cameras is not prior art.

The present invention also includes a computer program product which provides the functionality of any of the methods according to the present invention when executed on a computing device. Such computer program product can be tangibly embodied in a carrier medium carrying machine-readable code for execution by a programmable processor. The present invention thus relates to a carrier medium carrying a computer program product that, when executed on computing means, provides instructions for executing any of the methods as described above. The term "carrier medium" refers to any medium that participates in providing instructions to a processor for execution. Such a medium may take many forms, including but not limited to, non-volatile media, and transmission media. Non volatile media include, for example, optical or magnetic disks, such as a storage device which is part of mass storage. Common forms of computer readable media include, a CD-ROM, a DVD, a flexible disk or floppy disk, a memory key, a tape, a memory chip or cartridge or any other medium from which a computer can read. Various forms of computer readable media may be involved in carrying one or more sequences of one or more instructions to a processor for execution. The computer program product can also be transmitted via a carrier wave in a network, such as a LAN, a WAN or the Internet. Transmission media can take the form of acoustic or light waves, such as those generated during radio wave and infrared data communications. Transmission media include coaxial cables, copper wire and fibre optics, including the wires that comprise a bus within a computer.

Particular and preferred aspects of the invention are set out in the accompanying independent and dependent claims. Features from the dependent claims may be combined with features of the independent claims and with features of other dependent claims as appropriate and not merely as explicitly set out in the claims.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

BRIEF DESCRIPTION OF THE DRAWINGS

FIG. 18 illustrates a Binary Object Mask of the input image of FIG. 17, in accordance with embodiments of the present invention.

FIG. 19 illustrates a Gradient Mask of the input image of FIG. 17, in accordance with embodiments of the present invention.

FIG. 20 illustrates an example of warped playfield images projected on top of each other

Figure 1:
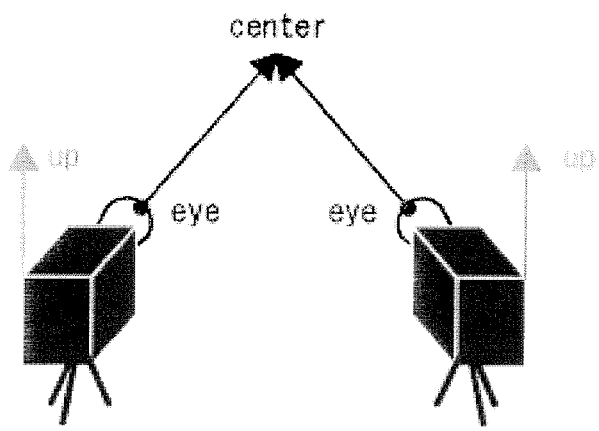
FIG. 1 illustrates virtual camera position and orientation.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

A virtual camera system in accordance with embodiments of the present invention comprises a plurality of physical cameras providing input images for a virtual camera and a hardware setup running software to create from the input images output images corresponding to virtual viewpoints for the virtual camera. Virtual camera views are generated from images captured by the real cameras. The present invention relates to a method used to define a virtual camera.

Embodiments of the present invention are illustrated by reference to a soccer field. This is, however, not intended to be limiting for the present invention.

FIG. 1 illustrates virtual camera position and orientation. The following parameters define the position and orientation of the virtual camera:

Eye position: Location of the virtual camera itself
Center position: Location of the point that the virtual camera is looking at
Up direction: Points in the "up" direction of the virtual view. Usually, this is a unit vector in the direction of the Z-axis.

For now, the following parameters define the imaging characteristics of the virtual camera:

Zoom factor: This parameter linearly enlarges or shrinks the image.
Slow motion factor: Allows the user to slow down the frame rate of the video. This will not affect the speed of virtual camera motion, so it can be used to create "Bullet-Time"-like effects.

A scenario is a sequence of virtual camera position, orientation and imaging parameters as described above. Every set of parameters is associated with a predetermined frame in the video. The virtual camera system will create intermediate camera parameters between frames, and effectively makes it "move".

Figure 2:
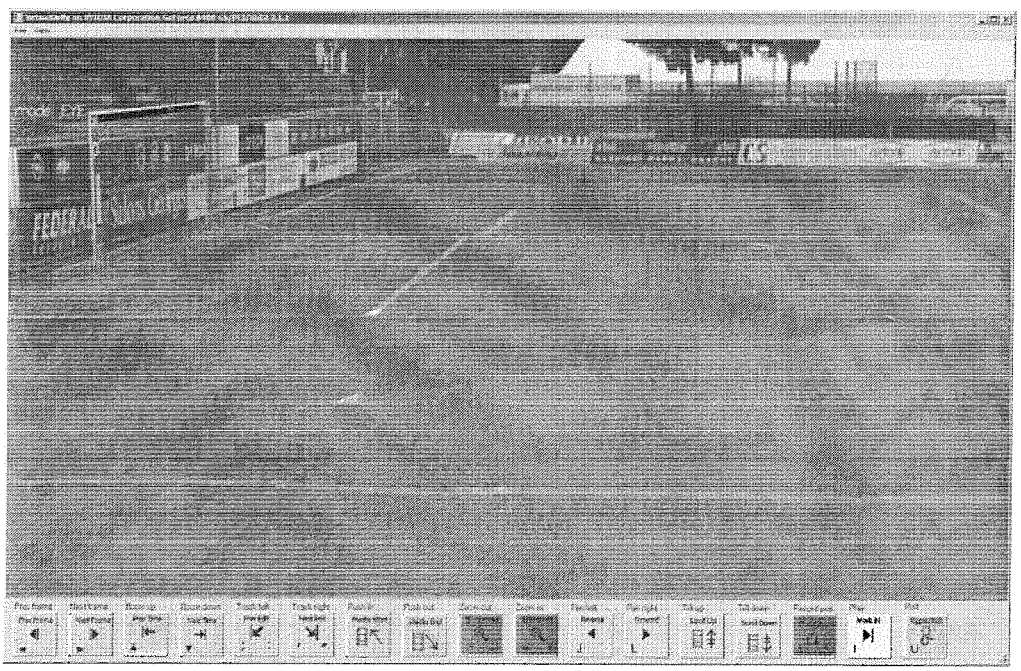
FIG. 2 illustrates the scenario editor according to embodiments of the present invention.

In accordance with embodiments of the present invention, virtual camera parameters can be entered directly in XML format, or can be interactively built and previewed using a scenario writer application. Such application will present the user with a rudimentary approximation of what the current virtual camera sees. An example of a scenario editor is illustrated in FIG. 2.

In order to create a scenario, the user navigates through the frames of the video, for example using the + and − keys. When a frame of interest (=key frame) is reached, the user can reposition the virtual camera for this frame using well known camera movements, such as pan, tilt, zoom, boom and track. This position can be recorded, and the user can continue to the next key frame.

By doing this a few times, a complete scenario can be assembled. A preview will be played when the user gives the corresponding command, e.g. presses 'P'. The scenario may be saved, for example by hitting the 'S' key, in any suitable format for further rendering, for example in an XML format.

It is to be noted that it is not essential to predefine the virtual camera scenario. In case the virtual camera system runs in real time, it is possible to define the scenario on the fly. One can envision a situation where a director or virtual camera operator steers the positioning of the virtual camera in real time, e.g. by means of a joystick-like controller.

The core of the virtual camera image interpolation for foreground objects in accordance with embodiments of the present invention is based on a technique called 'plane sweeping'. In a nutshell, this technique casts rays from the virtual camera onto the scene and projects points at different depths on this ray into the images of the physical cameras. The projection that results in the best color match in the different cameras is assumed to correspond to a real point in space where a foreground object with the matching color is located. The plane sweeping algorithm is explained in further detail below. The accuracy of point projection has an immediate influence on the quality of the matches and, by consequence, on the quality of the interpolated image. Projecting onto cameras should be done with accuracy better than 1 pixel, if the resolution of the output is to match the resolution of the input images.

Figure 3:
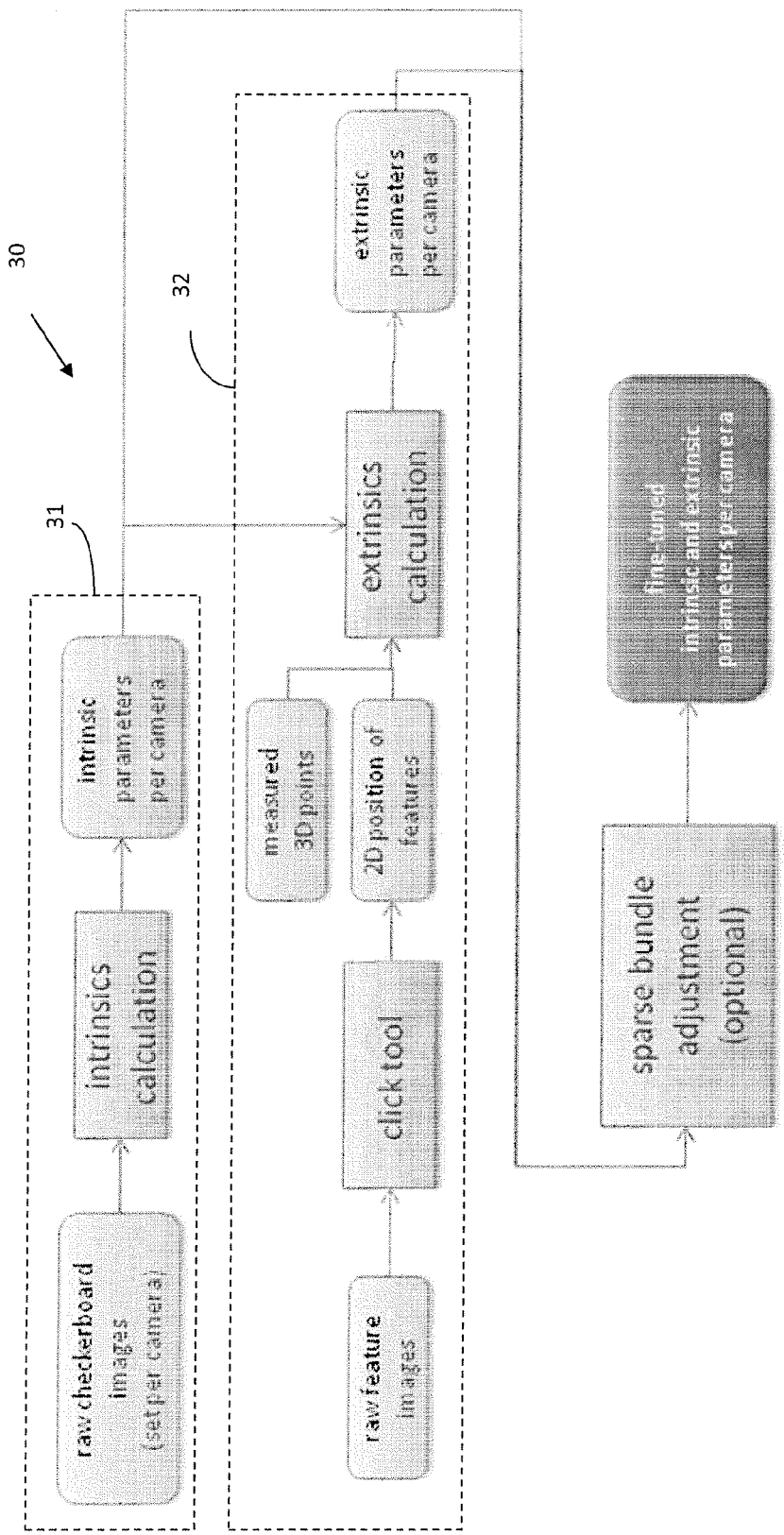
FIG. 3 is a flow chart of a virtual camera calibration process according to embodiments of the present invention.

Retrieval of the camera parameters for projections may be done through camera calibration. The different steps in such camera calibration process 30 are visually represented in FIG. 3. Traditionally, camera calibration distinguishes between two types of parameters: intrinsics and extrinsics. Hence camera calibration may happen in two passes. In a first pass 31, an intrinsic calibration may be performed on every physical camera. Intrinsic calibration is the process of determining the camera parameters for a single camera. Examples of these parameters are the focal length, the lens distortion (fish-eye and barrel), and the displacement of the sensor in relation to the lens. These parameters allow for future correction of the video, like undistortion. There are several methods to obtain these intrinsic parameters. The most commonly used technique for example uses checkerboards. In a second pass 32, an extrinsic calibration may be performed. Extrinsic calibration is the process of calculating how the physical cameras are positioned in the world, with for example the soccer pitch as reference. It will attempt to recover the precise location and orientation of the real cameras in 3D space. As with the intrinsic calibration, there are different methods to obtain the extrinsic parameters.

Figure 4:
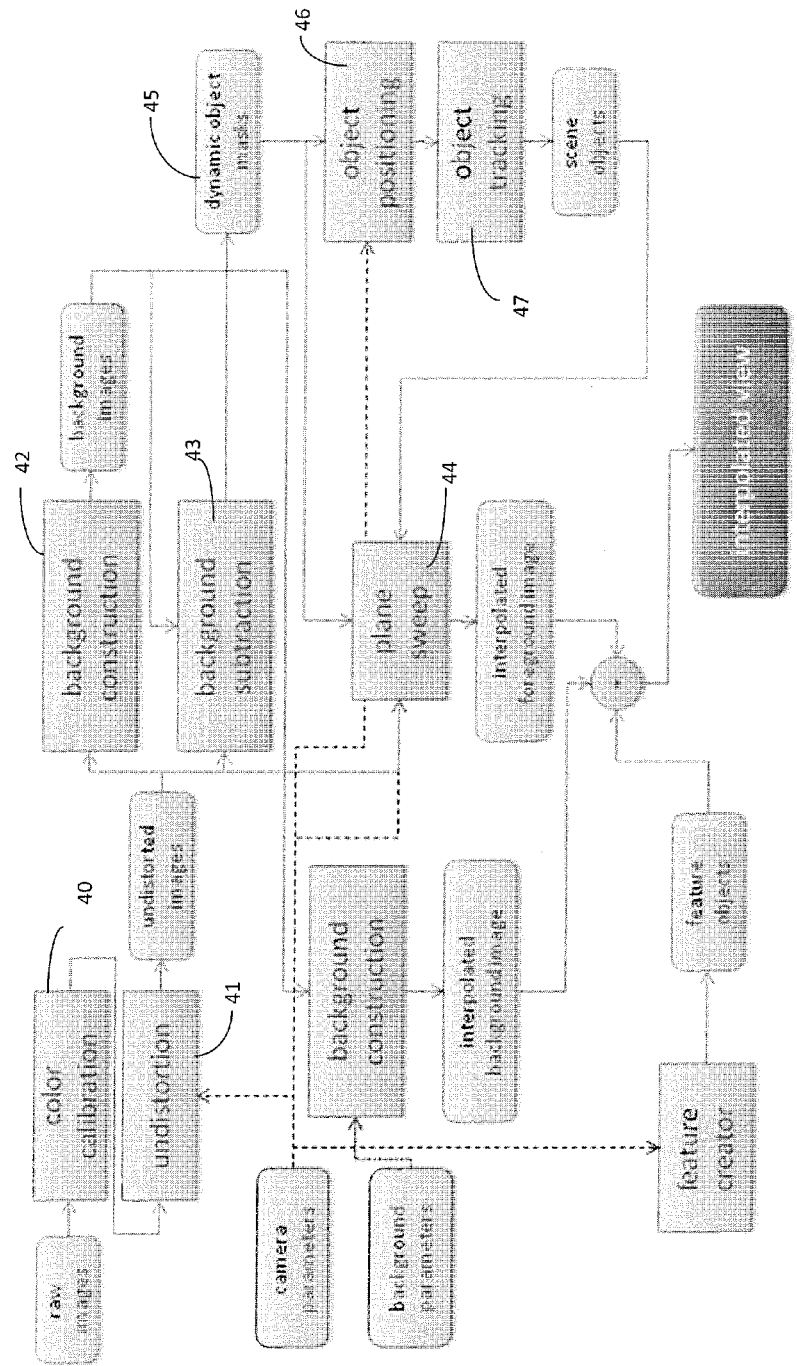
FIG. 4 is a flow chart of a virtual camera interpolation process according to embodiments of the present invention.

The interpolation process may comprise several processing steps. The actual viewpoint interpolation for the virtual camera position may be preceded by two preprocessing steps, as illustrated in FIG. 4. These steps are color calibration 40 and image undistortion 41.

Color Calibration

Figure 5:
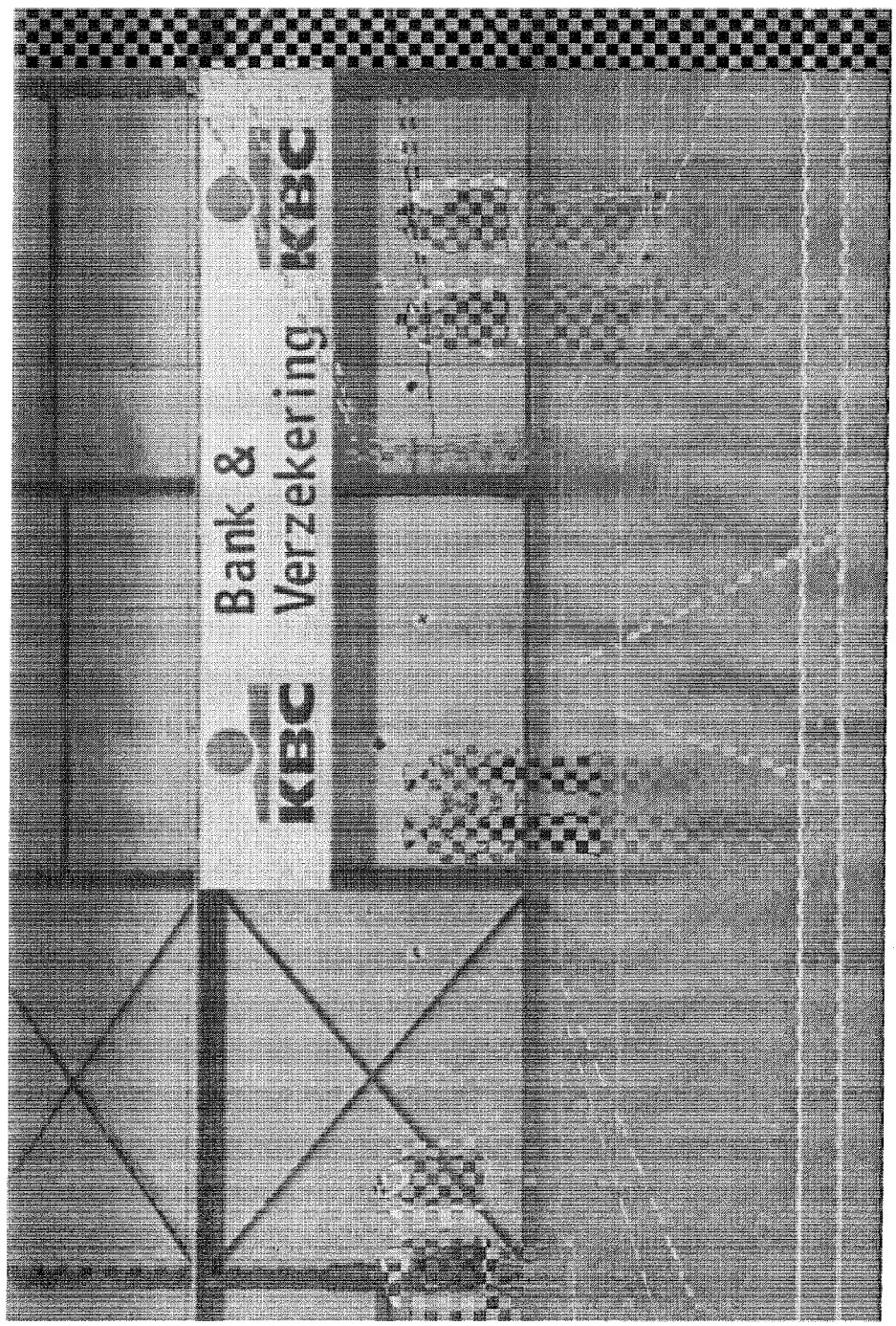
FIG. 5 illustrates a left and right scene view interleaved to illustrate color inconsistency.

Ideally, colors should appear the same in the images taken by various physical cameras. If there are differences, the color matching operations in the plane sweeper can suffer from false negatives. FIG. 5 illustrates a left and right scene view interleaved to illustrate color inconsistency, which can in particular be seen in the background portions (floor and wall portions).

Figure 6:
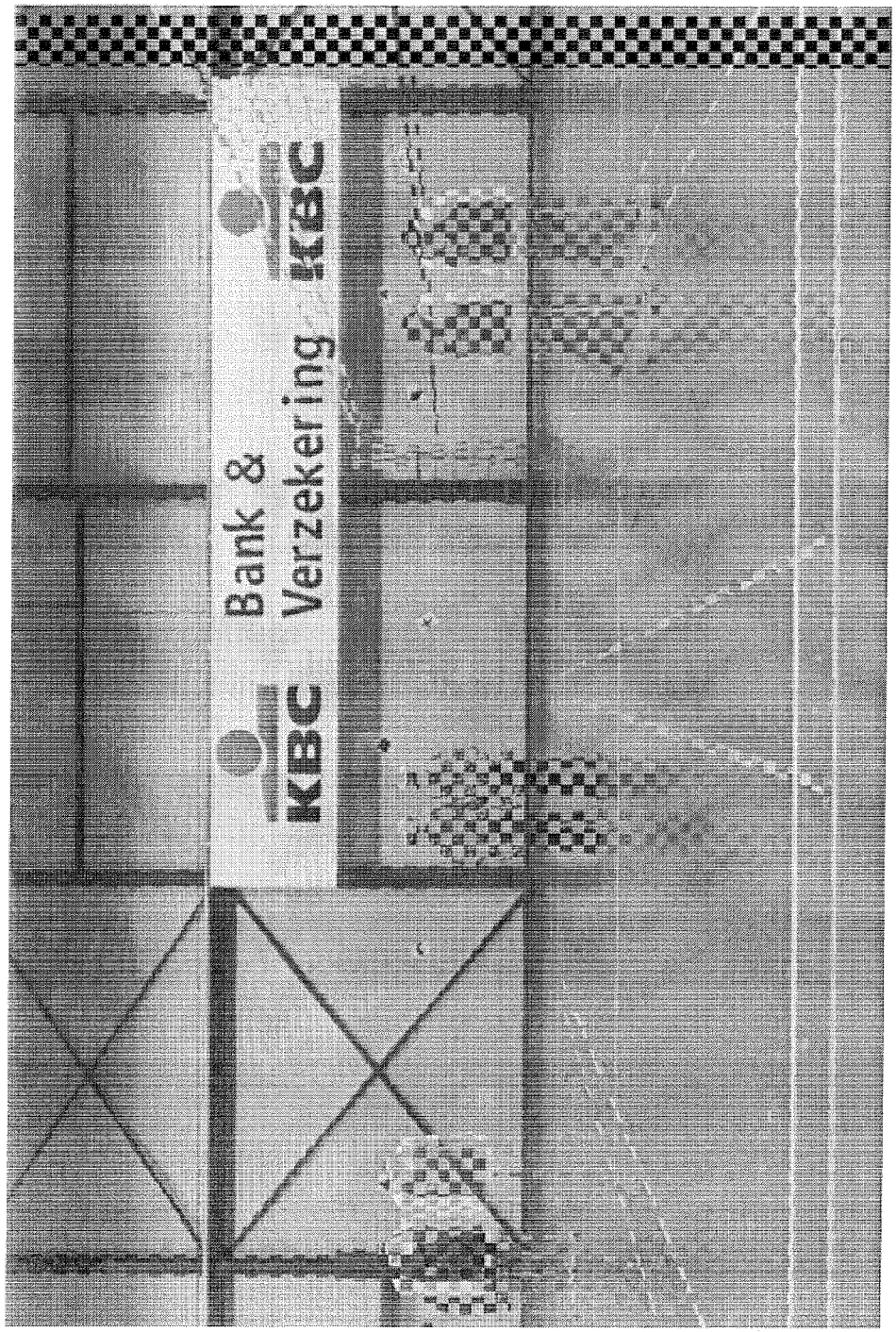
FIG. 6 illustrates color calibrated interleaved image.

Color calibration is generally considered a useful topic for view interpolation. In the color calibration step 40, the input images are altered to match better their photometric information. A color calibration process, e.g. an auto color calibration process, may for example be based based on an algorithm described in "Color correction preprocessing for multiview coding", Colin Doutre, Panos Nasiopoulos, IEEE Trans on Circuits and Systems for Video Technology, Volume 19, Issue 9 (September 2009). Its results can be observed in FIG. 6.

Undistortion

The plane sweeper algorithm is based upon the principles of an idealized pinhole camera model, comprising a lens which does not introduce any distortion. In practice, however, a lens will always introduce a certain amount of distortion due to manufacturing imperfections in terms of shape and/or alignment. The two main types of resulting distortions are referred to as radial distortion and tangential distortion. The former is typically the largest effect and causes light rays further from the center of the lens to bend or distort more, so that pixels near the image boundary are displaced more, introducing a barrel (cylindrical) or fisheye (spherical) distortion effect. The latter tangential distortion source is due to manufacturing defects which fail to position the lens perfectly parallel to the imaging plane. This behavior can be modeled using Brown's model of distortion (see [Brown DC (1966). "Decentering distortion of lenses.". Photogrammetric Engineering. 7: 444-462.]):

$$x_u = x_d + (x_d - x_c)(K_1 r^2 + K_2 r^4 + \ldots) + P_1(r^2 + 2(x_d - x_c)^2) + 2P_2(x_d - x_c)(y_d - y_c))(1 + P_3 r^2 + \ldots)$$

$$y_u = y_d + (y_d - y_c)(K_1 r^2 + K_2 r^4 + \ldots) + (P_2(r^2 + 2(y_d - y_c)^2) + 2P_2(x_d - x_c)(y_d - y_c))(1 + P_3 r^2 + \ldots).$$

This relatively complicated formula is based on a limited number of parameters $K_i$ and $P_i$ which were estimated using checkerboards during the intrinsic parameter calibration. Software can correct those distortions by warping the image with a reverse distortion. This involves determining which distorted pixel corresponds to each undistorted pixel. These computations stay fixed as long as the sources of distortion are not modified, i.e. the zoom (and to a lesser extent focus) settings of the camera are not modified. This implies that the actual derivation of the warping need only be computed once, whereas applying the (relatively cheap) actual warping or undistortion may be done for every frame of footage, presuming that the real camera settings are not altered during operation.

Figure 7:
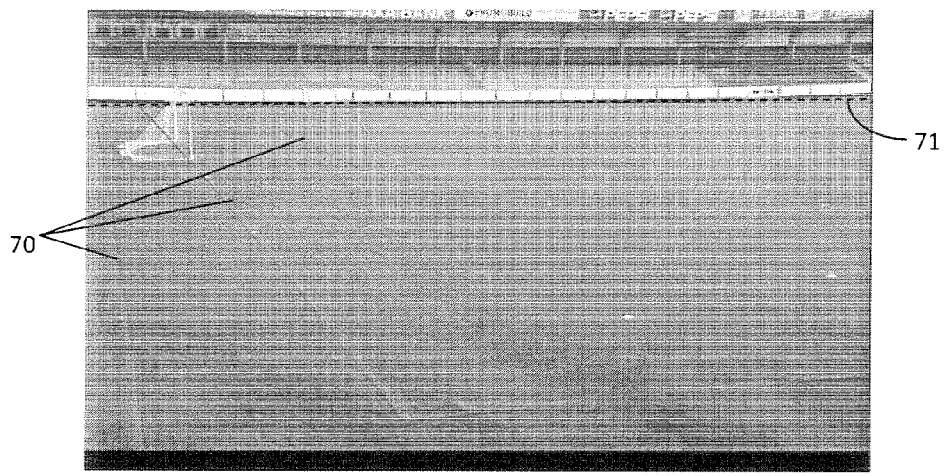
FIG. 7 illustrates an input image.
Figure 8:
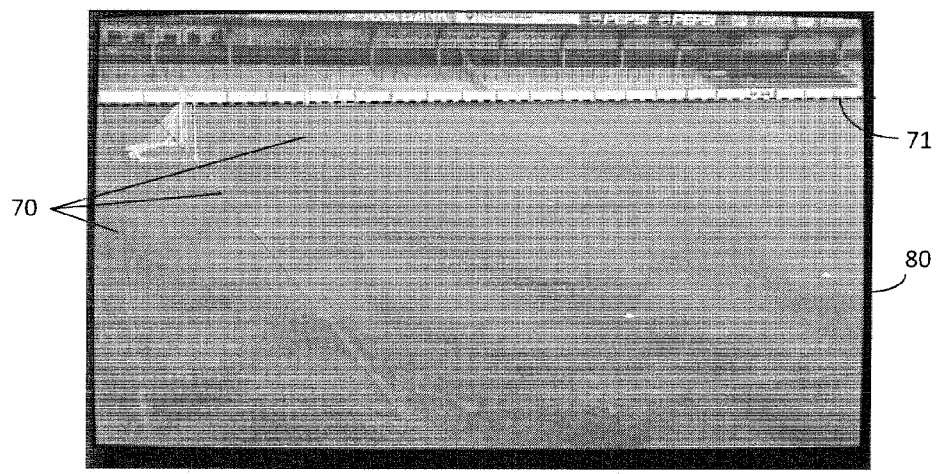
FIG. 8 illustrates an undistorted image.

FIG. 7 and FIG. 8 show an image of a football pitch, before and after undistortion warping, respectively. The undistortion warping to the bottom can be seen from the new black borders 80 around the image, which illustrate how the image has been nonlinearly warped/compressed. Additionally, a plurality of (straight) image edges 70 have been highlighted, combined with a dotted line 71 which is the best fitting line through points on theoretically straight image edges. Due to the distortion effects, the lines 70 in the first image are not fully linear, but are curved more as one approaches the edges of the image (cf. the border under the billboards near the top.) After undistortion these lines are straighter and the linear approximations indicated by the dotted line 71 coincide better with the straight edges.

Dynamic Background Subtraction

Figure 9:
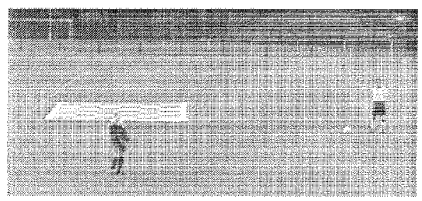
FIG. 9 illustrates an original frame
Figure 10:
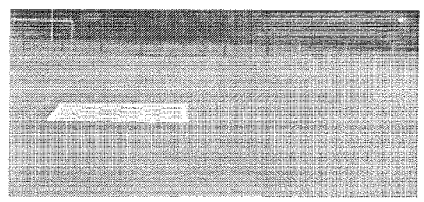
FIG. 10 illustrates a background of the frame of FIG. 9, constructed in accordance with embodiments of the present invention.

After the undistortion of the images of each physical camera, every frame is separated out into its slowly moving background part (background construction 42) and its rapidly moving foreground part (obtained by background subtraction 43 from the undistorted images). FIG. 9 illustrates an original frame, and FIG. 10 illustrates a corresponding constructed background.

The remainder of the processing of the frames is dealt with differently for the background part and for the foreground part, to exploit their different characteristics. The slowly moving background part, in the example illustrated comprising the soccer pitch, the bleachers, the billboards, ... has a fixed geometry which does not have to be continuously estimated, in contrast to the rapidly moving foreground part filled with players, the ball, the referee, .... This approach of splitting up in background part and foreground part reduces the depth estimation complexity by reducing the problem size. It also improves the visual quality, by reducing the depth estimation ambiguity for foreground objects, and by avoiding the depth estimation ambiguity completely for the background, which is interpolated based on the calibration data. This is especially helpful, because the soccer pitch consists of a homogeneous green surface, which would have otherwise severely complicated the depth estimation procedure. In accordance with embodiments of the present invention, the background and foreground objects are merged back together only at the final step.

The construction 42 of the background is a long running process. It is built incrementally using a large number of preceding frames (e.g. 2000). Pixels that remain stable are favored, pixels that change are suppressed. The end result is a stream of background frames which are relatively stable. Slow changes in the background (e.g. shadows shifting slowly, colors drifting due to the sun appearing, ... ) will be picked up by this process. Moving objects will not be picked up by this process and will be suppressed in the background frames. The background frames of a plurality of physical cameras, optionally of all cameras, may be used to build the background frame for the virtual camera.

Foreground Objects Rendering

After background subtraction 43, foreground objects, like players, referees and the ball, may be rendered using the plane sweep algorithm 44. The concept of this algorithm is explained below.

The goal of foreground object extraction is to identify foreground objects, i.e. objects that move relative to the static background of the scene, in each of the physical camera input streams, and to estimate the dimensions and positions of the corresponding objects in the 3-dimensional world coordinate system. The procedure for foreground object extraction is outlined below, and in accordance with embodiments of the present invention includes depth-box generation.

Figure 11:
FIG. 11 illustrates a binary mask in accordance with embodiments of the present invention constructed from the original frame illustrated in FIG. 9 and the background illustrated in FIG. 10 for discriminating foreground objects from background objects.
Figure 12:
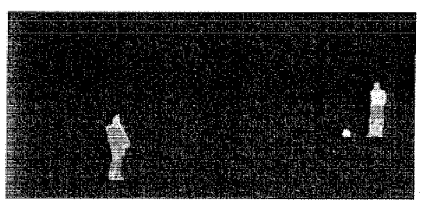
FIG. 12 illustrates a foreground frame in accordance with embodiments of the present invention, constructed from the original frame illustrated in FIG. 9 and the binary mask illustrated in FIG. 11.

A first step used for object identification and positioning is the detection of foreground pixels in the camera input frames, i.e. pixels corresponding to foreground objects. The result of this step is a binary mask 45 for each input frame of each physical camera, which discriminates the foreground objects from the background. Such mask is illustrated in FIG. 11. The binary masks are constructed from the original camera input streams and the matching background streams obtained in the previous step, on a frame by frame basis. From the binary masks and the original camera frames, the foreground frames may then be constructed, as illustrated in FIG. 12.

To obtain the binary masks, the following procedure may be used:

1. A first, optional, step is the matching of original input and background frame brightness. To compensate for changing lighting conditions, which are only tracked with some delay by the running background extraction, the brightness of the background frames and the original input frames can be equalized. In a straightforward implementation this may be done by calculating the average pixel luminance for the original input and background frames, and scaling the background pixels to obtain the same luminance. This luminance equalization is especially advantageous when the lighting conditions vary rapidly, which may often be the case in scenes only illuminated by natural daylight.

2. The next step is the subtraction of the original input frames and the corresponding (equalized) background frames. For this step, absolute differences may be taken for each of the color components of the pixels. The resulting difference frames give a first indication of where the foreground objects may be located for each camera.

3. Usually, the detection of foreground objects is only relevant for a limited volume in the world coordinate system. For instance, for a soccer playfield, the volume of interest typically comprises a beam with a ground area coinciding with the playfield (possibly extended by a margin), and a height of a few meters. Foreground objects outside this volume do not need to be reconstructed. Hence, the difference frames can be masked such that only pixels (possibly) corresponding to the volume of interest are retained. Such a mask can be constructed for each camera by a simple projection of the volume of interest onto the camera image area. A result of this masking is a reduction of the amount of foreground noise.

4. The resulting absolute difference frames contain pixels with varying values. To reduce the amount of foreground noise even further, a binary threshold may be applied to the difference frames: small values for pixel color components are set to zero. All other pixel components are set to a non-zero value. The threshold value is typically a parameter that must be adapted to the scene at hand.

5. Next, (binary) color components of the threshold frames are merged. This may be done via a standard color-to-gray color conversion.

6. At this point, the resulting frames already contain a lot of information about which pixels correspond to foreground objects and which not. I.e. the images are already a good approximation of the desired foreground object masks. However, these masks are typically still very noisy and contain both false positive pixels and false negative pixels. Therefore, the next steps aim at reducing the amount of noise. A first technique may be based on contour detection. A standard contour detection is applied to each of the threshold frames. Based on these contours, a new binary threshold frame may be constructed:

a. Contours with a small area are rejected as they typically correspond to noise outside the real foreground objects (false positives). Hence they are not drawn on the new frame.

b. Contours with a sufficiently large area are drawn and completely filled with white on the new mask frame. This gets rid of some of the noise inside the foreground objects' outline (false negatives).

7. A final filtering step applies a morphological filter to the resulting mask frames: by a number, e.g. a plurality, of erode and dilate operations, the outlines of the foreground object masks are smoothed. Moreover, this reduces the chance that foreground objects are represented by several unconnected mask segments as the segments are likely to stick together during this filtering step.

In cases where a large part of the static background of a scene can be described by a relatively simple model 3D-model, it may be possible to estimate the foreground object positions 46 based purely on the foreground mask frames and the background model. For sports events such as soccer, for instance, the position of the ground plane (playing field) relative to the cameras is known after camera calibration. Most foreground objects are in contact with the playing field during most of the time, or at least in near contact. This is especially true for the players. Hence, given a mask segment that corresponds to a player, it is relatively easy to make a first estimate of the player's 3D position: one can take the 2D image coordinates of the bottom of the mask segment (for an arbitrary camera) and project it back onto the world coordinate system and look for the intersection with the background ground plane.

Figure 13:
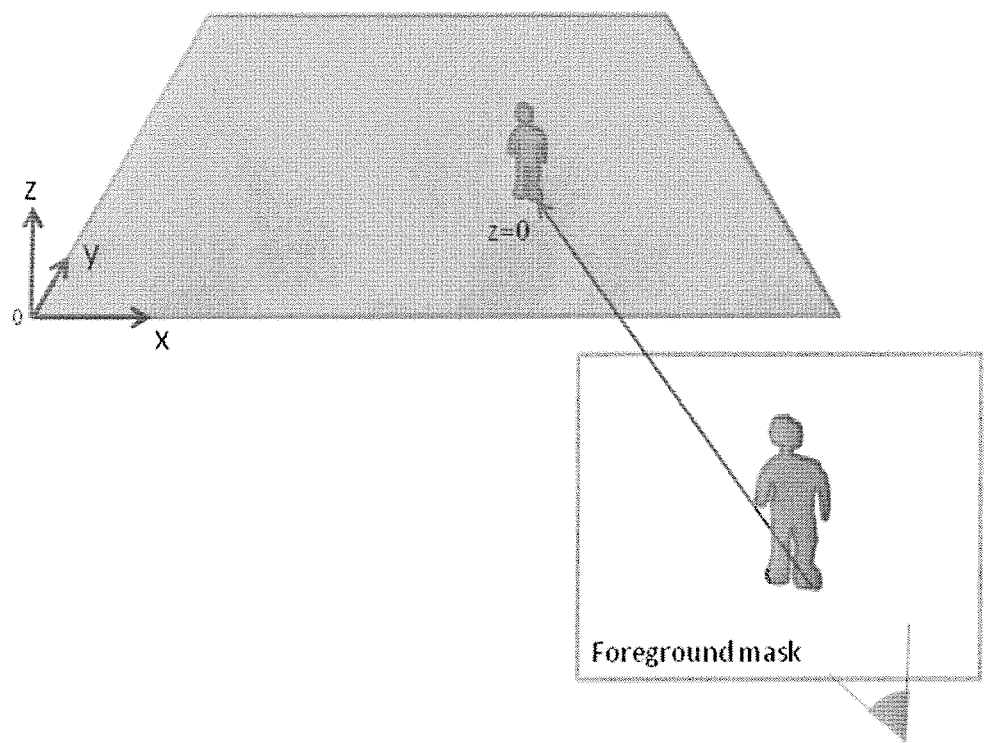
FIG. 13 illustrates Zero-Z object position estimation in accordance with embodiments of the present invention.

If the world coordinate system is chosen such that the Z=0 plane coincides with the background ground plane, the crossing of the back-projected ray is relatively easy to calculate mathematically: the z-coordinate of the object's world position must be zero too. This is illustrated in the FIG. 13.

It is to be noted that this back-projection can be performed independently for every foreground segment in every camera foreground mask. No cross-matching between cameras is needed for object position estimation.

In practice, the object positions obtained in this way are only approximate. The simple Zero-Z projection technique does not take into account the fact that in reality, a playing field is rarely perfectly flat. Moreover, when foreground objects do not touch the ground plane, the Zero-Z assumption is also invalidated. However, for many objects, the estimated position can be used as a good first-order estimation, which is often already good enough for virtual camera image interpolation. Even if it is not accurate enough for interpolation, it can be used as a starting point for further object position refinement.

It is to be noted that, according to embodiments of the present invention, a more detailed background model, modeling height variations more accurately, can be used to improve the Zero-Z position estimation accuracy, so as to obtain a more accurate position estimation.

The shortcoming of Zero-Z object position estimation is that is becomes more inaccurate as the elevation of the foreground object increases (e.g. balls flying through the air, or players jumping). To improve the accuracy, mask information from different physical cameras can be combined.

Space carving is a general technique for reconstruction of 3D objects from 2D images taken from different cameras. For the plane sweeping used in the virtual camera image interpolation in accordance with embodiments of the present invention, the most important information is the position of the foreground objects. Hence, it is not necessary to implement a full 3D space carving. A simplified form of it, based on 2-dimensional triangulation, can already estimate the foreground object positions with great accuracy.

To implement this, a 2-dimensional high-resolution image may be constructed, representing the playing field's pitch. The bounding boxes of the foreground mask frames are then projected onto the playing field image. The intersections of these projections indicate the positions where foreground objects may be located, independent of their elevation above the field. Moreover, an approximation of the 2-D hull of the objects in the world-coordinate system may be obtained in this way. This hull can be used to estimate the depth over which the plane sweeping has to operate for the objects. This is illustrated in FIG. 14.

Figure 14:
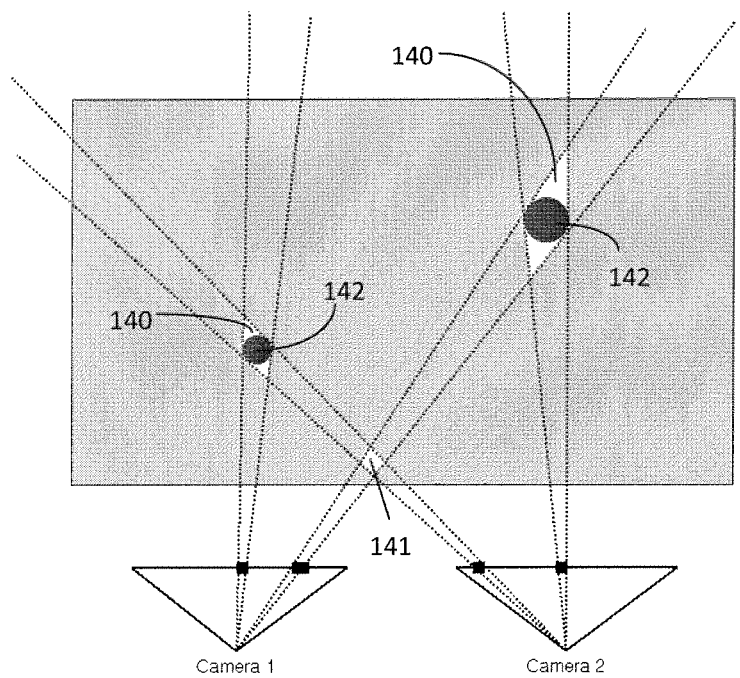
FIG. 14 illustrates an estimation of the depth over which depth-box constrained plane sweeping in accordance with embodiments of the present invention has to operate.

In FIG. 14, the foreground masks of two objects are projected onto the playing field image for two cameras. This results in three possible objects positions, indicated by the white regions 140, 141. It is to be noted that, if a camera can see a region of the field and none of its objects masks project onto the region, then no object can be located in that region.

In this case, however, the intersection is not fully conclusive: one of these positions 141 corresponds to a so-called 'ghost object'. Ghost objects do not correspond to a real object (indicated by the dots 142). For the plane sweeping based interpolation, ghost objects are not necessarily problematic, especially if the real objects are not too close together. (Plane sweeping uses a more accurate form of triangulation which can often filter ghost objects.)

When the number of objects on the field becomes larger and/or the objects are positioned close to each other, additional techniques may be needed to eliminate ghost objects. One example of a straightforward method is to add more cameras looking at the scene from different angles. The extra information can reduce the number of false intersections.

Another possible technique to reduce the number of ghost objects is to clip the projected object masks by using information from other approximate object position estimations. For instance, the Zero-Z object position estimation technique can be used to restrict the distance over which an object mask is projected. The shorter mask projections can be made, the fewer chances there are that ghost intersections remain.

For pure interpolation purposes, knowledge of the estimated positions and dimensions of objects is sufficient. However, for other purposes, such as augmented reality features, it is advantageous that objects can be tracked over frames. The simplest form of object tracking 47 can be based purely on the history of the detected object positions. Generally, the change in position between frames is relatively small for a foreground object. This observation can be used to match object positions over frames: if two positions in two consecutive frames are close together, it is quite likely that both positions correspond to a same foreground object (that has moved). By linking the best matching object positions across frames, objects can be tracked over time.

This simple tracking method may suffer from ambiguities, though. When foreground objects are moving closer together, the position matching confidence is likely to decrease, possibly resulting in incorrect tracking. To overcome this problem, the basic tracking can be extended with additional techniques, such as feature based object matching (using for example a feature extraction method such as the SURF (Speeded Up Robust Features) algorithm) or trajectory estimation, for example using Kalman filters. Feature matching can be used both between consecutive frames of the same camera as between frames of different cameras.

Feature matching can be used both between consecutive frames of the same camera as between frames of different cameras.

In the former case, feature matches can be used to estimate the movement of objects as seen from one camera. This information can be used to improve the 3D object tracking directly, as the extra information limits the freedom of the basic position matching.

In the latter case, feature matches across cameras can be used to increase the accuracy of the estimated object positions and hence enhance the tracking accuracy. Object position estimations could even be based purely on feature matching between cameras, provided that the feature matching is sufficiently accurate.

Finally, object tracking can be used in a feedback loop to increase the object position estimation accuracy. For instance, ghost objects are typically short-lived as the real foreground objects often move. Object tracking can then be used to detect objects that suddenly appear and/or disappear. Such objects are likely to be ghost objects.

Given the positions of objects for a certain frame, and the tracking information, it becomes relatively easy to render interpolated images in which certain objects have been 'erased'. For instance, for replay purposes, it may be interesting to render only the few players that were directly involved in a certain phase of the game. Based on the object tracking, the plane sweeping interpolation can be steered to render only the interesting objects. It is even possible to move objects in the virtual camera, e.g. to animate how players blocking the view from a certain viewpoint, are moved out of the way.

Depth-box Constrained Plane-sweeping

Figure 15:
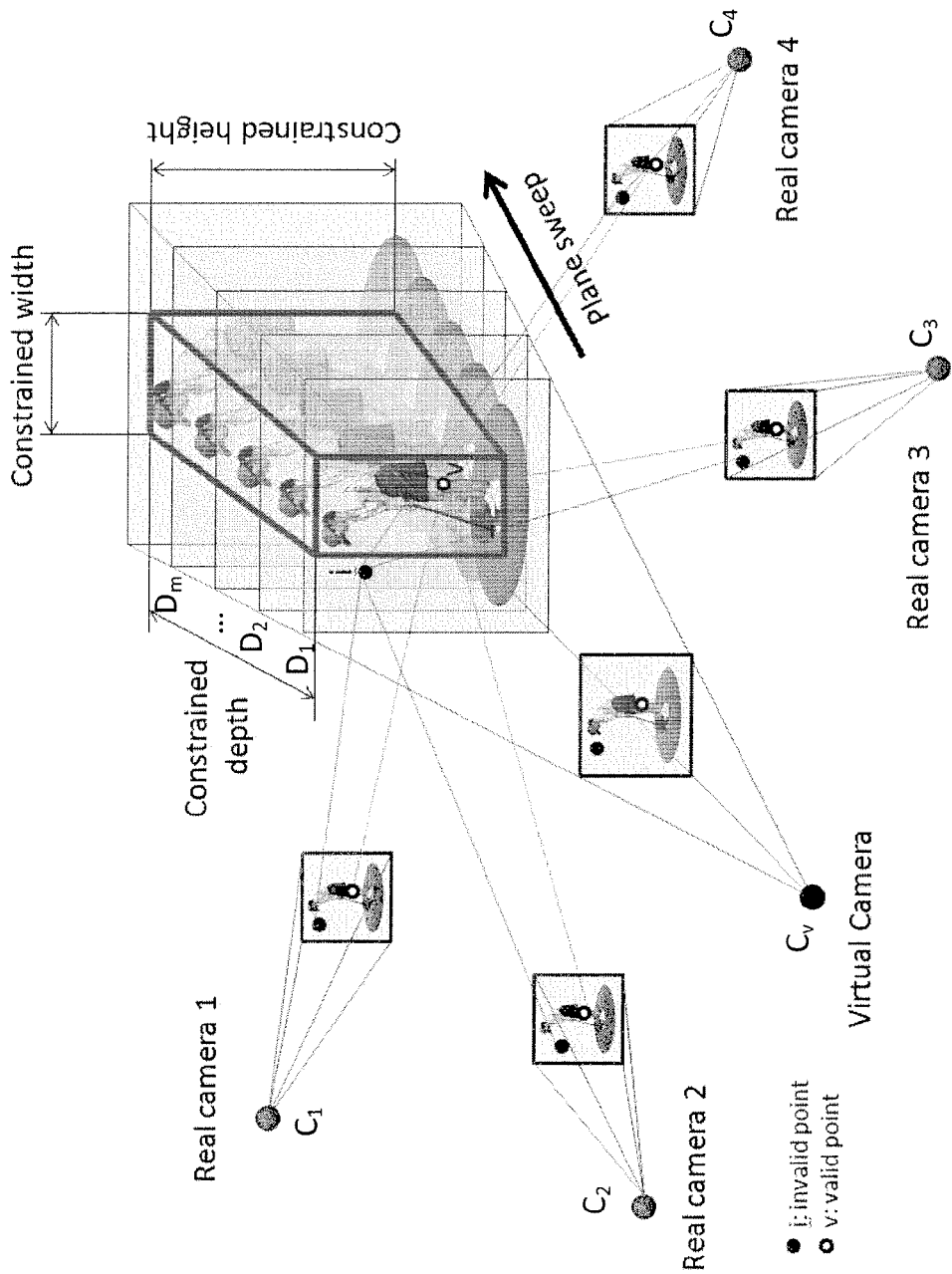
FIG. 15 illustrates a plane sweep algorithm in accordance with embodiments of the present invention.

For the actual computation of the virtual camera video stream in accordance with embodiments of the present invention, a technique known as plane sweeping 44 may be used. This technique was published by R. Yang et al. in "Real-Time Consensus-Based Scene Reconstruction using Commodity Graphics Hardware" and refined by M. Dumont et al. in "a prototype for practical eye-gaze corrected video chat on graphics hardware". The basic principle is the following, as illustrated in FIG. 15.

For every pixel of a virtual camera, the plane-sweeping technique casts a ray from its own (virtual) focal point Cv onto the scene. At a discrete set of depths $D_1 \rightarrow D_m$, the points on these rays (i and v) are projected back into a set of real camera images, in the example illustrated $C_1 \rightarrow C_4$. For the pixels found through this projection a matching algorithm is used across all real images. For each ray, the depth with the best matching score is used to calculate the pixel to be used in the virtual camera image, as this should correspond to a real point is space.

In order to use this technique for viewpoint interpolation, the camera configuration parameters should be known for all cameras, including the virtual camera. The configuration parameters include camera intrinsic parameters (like focal point, sensor size, distortion parameters, etc.) and the extrinsic parameters (3D positioning coordinates and viewing angles). Therefore the camera calibration stage 30 is advantageous.

Also, as a pixel matching algorithm, comparing color information seems to provide the most accurate results when doing viewpoint interpolation. Hence a color calibration phase 40 seems to improve the plane-sweeping results, as it eliminates color mismatches due to difference in overall lighting for example.

As stated before, the plane-sweeping technique looks for best color matches across pixels of the different cameras. However, results have shown that this technique may lead to 'false positive' results: best color matches that do not respond to a real point.

Figure 16:
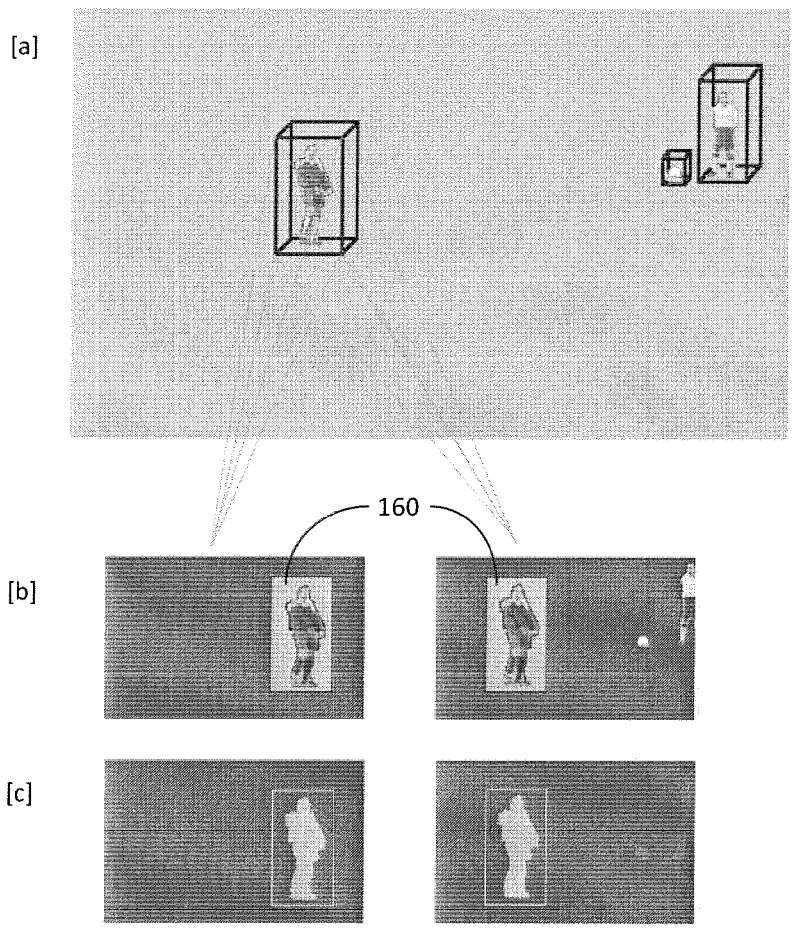
FIG. 16 illustrates that the plane sweeping system in accordance with embodiments of the present invention only uses pixels when they fall on the areas indicated by 160.

The plane sweeping technique can suffer from a cross-eyed problem: accidently a best color match can be found from different background pixels when rays are crossing in front or behind foreground objects. To limit such false positive color matches in the plane sweep, foreground and background objects in the content are separated at an early stage (dynamic background subtraction 43). Then the plane-sweeping technique is only used on the foreground objects. This concept is illustrated in FIG. 16 (depth-box constrained plane sweeping). In part [a], the complete images from the different cameras are used, which potentially leads to lots of false positives. Better results are achieved when constraining the plane sweep around an object of interest. A first approach is to embed the object in a rectangular box, as illustrated in part [b] of FIG. 16, and is called depth-box constrained plane-sweeping.

In order to constrain the plane sweeping even further, the masks used to do the foreground segmentation are also used when doing the plane-sweeping on the foreground objects: i.e. when a back-projected ray ends up outside an objects mask, that depth is ignored as it could lead to a false-positive match. This can be seen in part [c] of FIG. 16.

In order to limit the depth range under evaluation, the positioning information obtained from the input (at the moment of depth-box generation) is reused here. For every object a start and end depth can be calculated by projection of the bounding rectangle around the masks in every input image onto the ground plane of the real-life scenario. These projections lead to a minimal and maximal depth where the object can be found. Doing a plane-sweep for that object on a larger depth range does not make any sense. Even more, it could only lead to false-positive color matches, and hence interpolation errors.

A second technique that may be applied to improve the results of the plane-sweeping technique is the use of gradient masks for the foreground pixels, instead of a pure binary mask, to adjust the weight of pixels from all inputs.

Figure 17:
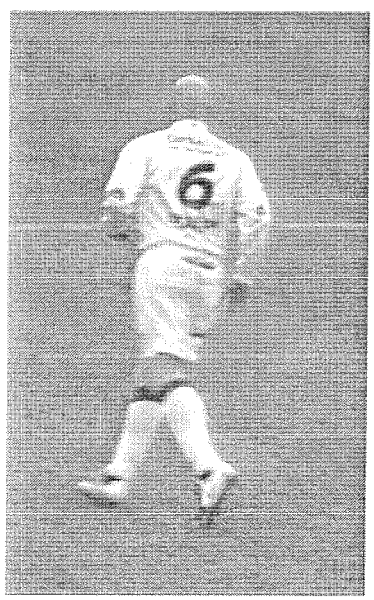
FIG. 17 illustrates an input image

In a binary mask, a pixel is either part of the foreground object or not. By applying a gray-to-white gradient from left to right onto the generated (binary) masks, extra pixel information is added to the mask with respect to the (physical) location (left/center/right) of each pixel on the foreground object. When using this additional information, the plane-sweeping technique searches for the best color match in the foreground pixels, while also keeping track of the best gradient-match. This way the chance of matching only pixels on the left or only pixels on the right increases. Hence the chance of getting left/right false-positive color matches is reduced. As an example, FIG. 17 shows an input image, FIG. 18 a corresponding binary mask and FIG. 19 a corresponding gradient mask.

In an Object Oriented implementation of the virtual camera software according to embodiments of the present invention, a selection can be made between different pixel composer objects in combination with the plane-sweeping technique. These pixel composer objects may be in charge of two distinct tasks: the calculation of the matching score of a given set of pixels from real cameras, and the calculation of the resulting color value(s) for every virtual camera pixel in function of the best found matching score(s).

For the calculation of the matching score, well known techniques like Sum of Absolute Differences (SAD) and Sum of Squared Differences (SSD) can be used. In addition three more pixel composer objects have been devised to improve the overall results of the plane-sweeping algorithm:

sub-pixel accurate pixel composer,
search window pixel composer,
accumulated pixel-area pixel composer.

The sub-pixel accurate pixel composer increases the accuracy when doing the back-projection into the real camera images. The result of such a projection is a pixel coordinate pair, represented as double values. However, since images contain discrete integer pixel coordinates (only rows and columns), the sub-pixel information is ignored in a standard approach. However, by adding established sub-pixel approximation techniques, the overall accuracy of the plane sweeper increases.

Since small errors are unavoidable in the camera calibration phase, it can be such that the back projection of pixels actually ends up a few pixels away from what it would be in the ideal case. To compensate for this effect, the search window pixel composer not only looks at the pixel onto which it was projected, but within that real camera image it also looks to the surrounding pixels to see if a pixel with a better matching score can be found. If this is the case, the surrounding pixel is selected and hence a compensation is obtained for the accumulated chain of small errors from earlier steps in the chain.

Another pixel composer variant uses the accumulated pixel area when calculating pixel matching. In this approach use is made of the correlation that can be found within neighboring pixels. So instead of comparing the color information of a single pixel, the color information is accumulated over a given area around the given pixel and that result is used to obtain a color matching score. This way subtle color and/or light intensity differences are ignored and the overall matching results are improved.

By combining all the techniques mentioned before, the plane-sweeping technique in accordance with embodiments of the present invention in combination with the forementioned enhancements can be used to generate interpolated images with resolutions higher than the resolution of the input images, also known as super-resolution.

Since the back projection onto the real camera images within the plane-sweeping technique will most likely never exactly end up inside a real pixel, these small pixel misalignments can be used to generate super-resolution images. By combining the input images from multiple normal resolution cameras, and the fact that their alignment will almost certainly not be pixel-perfect, this plane-sweeping technique can also be used as a resolution enhancement approach.

This super-resolution result, however, does not necessarily mean that the output of the interpolation is of a higher resolution than the input; it could be the same resolution but on only a part of the input images. Hence, this allows to do the virtual camera positioning away from the axis of the real cameras. If the virtual camera system is positioned in front of all the cameras, the result will be similar to super-resolution output.

Background Rendering

The slowly moving background, comprising the soccer pitch, the bleachers, the billboards, . . . has a fixed geometry which does not have to be continuously estimated, in contrast to the rapidly moving foreground filled with players, the ball, the referee, . . . . Therefore, in accordance with embodiments of the present invention, a background model was constructed for each view, comprising only slowly moving objects, which can safely be assumed to lie on the background. Since the extrinsics calibration was based on significant feature points positioned on the soccer pitch, it is known how each pixel of the background model should be transformed when observed from the virtual camera.

By using the matrices created during the calibration process, it is possible to calculate for each point in the real 3D world (e.g. a corner point) where it should be projected in each of the 2D camera frames and at which pixel position it should end up in the resulting frame of the virtual camera.

During the calibration, the exact coordinates of the playfield are also captured. Therefore, the program knows where the playfield can be found in the real world. With all this information it is possible to calculate where the playfield will be seen in the virtual camera and where it can be seen in all of the real input cameras, as illustrated in the top part of FIG. 20.

A first method to interpolate the background according to embodiments of the present invention may be based on an approximation of the geometry by a limited set of planes: all of this information is used to build a homographic transformation (essentially a transformation between planes) between each image of a real camera and the future image of the virtual camera. These homographic transformations are applied to the background frames which were constructed above. These transformations result in a warped background image of the playfield for each real input camera. The bottom part of FIG. 20 illustrates an example of warped playfield images projected on top of one another.

One of these images could be used as the background frame for the virtual camera. Since in practice none of the cameras has a full view of the playfield, not one single image is chosen, but a blend is made between the different images.

Figure 21:
FIG. 21 illustrates the three warped background planes.
Figure 22:
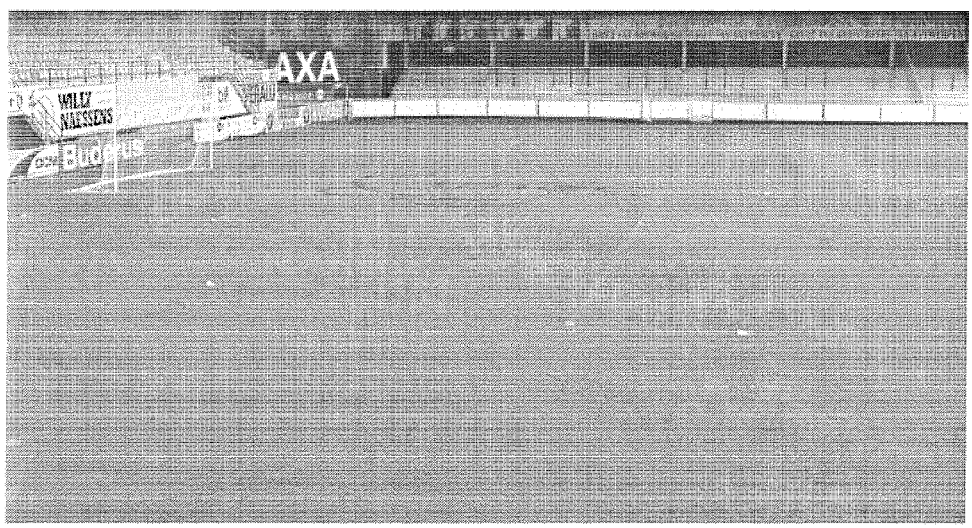
FIG. 22 illustrates a generated background frame for the virtual camera in accordance with embodiments of the present invention.

In the same way both the real world area behind the playfield and the area left of the field may be treated as if they were planes, as illustrated in FIG. 21. The homographic transformations may be applied to the extracted background frames for these areas and the resulting images may be blended together.

While the playfield actually is a near-perfect plane, the areas behind and at left and right hand sides of the playfield typically are not. Treating them like planes gives some visual distortions which can be visible in the generated background frames. Refining the background model to take the actual structure of the scene into account can help here.

Further quality improvements can be obtained by considering the fact that, while the playfield is indeed a near-perfect plane, it is not an exactly perfect plane: the fields are actually very slightly curved to accommodate water drainage. The result is that the field marking's curvature can be slightly off when warped located on a plane. This can be addressed if the calibration was based on sufficient 3D measurements (e.g. provided by GPS-based surveying tools). These will not only improve the calibration accuracy, but they can also be used to model the field as a more complicated mesh-based 3D surface, as opposed to a single plane. The corresponding complexity increase need not be a problem either, since GPU's are very efficient for this task.

The actual background frame for the virtual camera may be the blending of all of the described warped image pieces. The interpolated foreground objects can subsequently be superimposed on this background frame.

Real-time Behavior

The virtual camera image interpolation system according to embodiments of the present invention is designed to run in real-time. This may be achieved by:
- designing the software architecture in such a way that the workloads can be distributed and parallelized across different CPU cores, using pipelining of data streams where necessary. The resulting multithreaded system gains performance as more CPU cores are added.
- using hardware acceleration for pixel processing and perspective transformations (OpenGL) and projection of 3D points (vertex processing).

Metric Calibration

In essence, calibration algorithms can produce calibration parameters based solely on the position of several feature points in the scene in the different camera views. The orientation and scale of the coordinate system for the camera extrinsics entirely depends on the real-world coordinate system in which the feature points are measured. An arbitrary coordinate system can be chosen for these measurements. Therefore, metric calibration can be achieved by placing the feature points used during the calibration process at metric locations, meaning that their position is known relative to a selected reference system with metric unity vectors. Or in other words, the feature points for calibration are positioned in a well-defined metric world model. For a football pitch, an obvious choice is to place the origin at a corner of a pitch, with the x and y axes pointing along the length and width of the pitch, respectively, and with the z-axis pointing upwards. The unity vectors are selected to be 1 meter. Metric calibration is not strictly required by the interpolation process: the interpolation algorithms uses the resulting calibration parameters, and makes no assumption on how they were achieved. There are advantages to use metric calibration though, the main one being that it is easier for humans to reason in this reference system. The definition of for instance depth box positions and sizes make more sense when they are defined in a metric reference system, than if they are defined in an arbitrary reference system.

While the invention has been illustrated and described in detail in the drawings and foregoing description, such illustration and description are to be considered illustrative or exemplary and not restrictive. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A method for creating a virtual viewpoint of a plurality of images of a scene captured by a plurality of cameras, the images comprising a plurality of current frames and previous frames, the method comprising:
    creating background frames by combining a set of previous frames;
    creating a plurality of foreground masks by performing segmentation on the plurality of current frames, the segmentation comprising separating foreground objects from background objects using the created background frames;
    extracting the foreground objects by AND-ing the plurality of current frames with the created plurality of foreground masks;
    obtaining a position estimate within the scene for at least one foreground object;
    projecting representations of the created foreground masks for the at least one foreground object onto a two-dimensional ground plane of the scene, wherein the projecting is clipped by using the obtained position estimate to restrict a distance over which the representations of the created foreground masks are projected, thereby reducing a likelihood of false intersections;
    constructing a three-dimensional depth-box for the at least one foreground object based on an intersection of the projected representations of the foreground masks in the two-dimensional ground plane;
    rendering the at least one foreground object using a depth-box constrained plane sweeping algorithm on the plurality of current frames, wherein a plane sweeping depth range for the at least one foreground object is constrained by the constructed three-dimensional depth-box for the at least one foreground object;
    rendering a view-dependent background image by performing homographic transformations on the created background frames; and
    creating the virtual viewpoint by superimposing the rendered at least one foreground object on the rendered view-dependent background image.

2. The method according to claim 1, wherein creating background frames by combining a set of previous frames comprises combining the set of previous frames in a sliding-window manner.

3. The method according to claim 1, furthermore comprising calibrating the plurality of cameras using intrinsic and extrinsic calibration techniques.

4. The method according to claim 1, furthermore comprising, before further processing of the plurality of images, pre-processing the captured plurality of images, the preprocessing comprising at least one of color calibration of the plurality of images and undistortion of the plurality of images.

5. The method according to claim 1, wherein creating a plurality of foreground masks comprises creating a set of binary or gradient masks, each mask corresponding with a current image, which discriminates the foreground objects from the background.

6. The method according to claim 1, wherein constructing the three dimensional depth-box comprises calculating for the at least one foreground object a width, a height, a start depth, and an end depth based at least on the intersection of the projected representations of the foreground masks on the ground plane.

7. The method according to claim 1, wherein the depth-box constrained plane-sweeping algorithm uses one or more pixel composers, the pixel composers being any of a sub-pixel accurate pixel composer, a search window pixel composer, or an accumulated pixel-area pixel composer.

8. The method according to claim 1, further comprising generating interpolated images with resolutions higher than the resolution of the plurality of images using a plane-sweeping technique.

9. The method of claim 1, wherein the two-dimensional ground plane corresponds to a playing field in the scene.

10. The method of claim 1, wherein the representations of the created foreground masks for at least one foreground object comprise bounding rectangles encompassing the created foreground masks.

11. A virtual camera system comprising a plurality of physical cameras providing input images of a scene for a virtual camera having a virtual viewpoint, and an imaging device for creating from the input images output images corresponding to virtual viewpoints for the virtual camera, the imaging device comprising at least one processor and at least one memory configured to store instructions that when executed by the at least one processor cause the imaging device to perform functions comprising:
  creating background frames by combination of a set of previous frames;
  creating a plurality of foreground masks by performing segmentation on a plurality of current frames, the segmentation comprising separating foreground objects from background objects using the created background frames;
  extracting the foreground objects by AND-ing the plurality of current frames with the created plurality of foreground masks;
  obtaining a position estimate within the scene for at least one foreground object;
  projecting representations of the created foreground masks for the at least one foreground object onto a two-dimensional ground plane of the scene, wherein the projecting is clipped by using the obtained position estimate to restrict a distance over which the representations of the created foreground masks are projected, thereby reducing a likelihood of false intersections;
  constructing a three-dimensional depth-box for the at least one foreground object based on an intersection of the projected representations of the foreground masks in the two-dimensional ground plane;
  rendering the at least one foreground object using a depth-box constrained plane sweeping algorithm on the plurality of current frames, wherein a plane sweeping depth range for the at least one foreground object is constrained by the constructed three-dimensional depth-box for the at least one foreground object;
  rendering a view-dependent background image by performing homographic transformations on the created background frames; and
  creating the virtual viewpoint by superimposing the rendered at least one foreground object on the rendered view-dependent background-image.

12. The virtual camera system according to claim 11, wherein constructing the three dimensional depth-box comprises calculating for the at least one foreground object a width, a height, a start depth, and an end depth based at least on the intersection of the projected representations of the foreground masks on the ground plane.

13. A non-transitory computer-readable medium having stored therein instructions that, when executed by a computing device, causes the computing device to perform functions comprising:
  creating background frames by combining a set of previous frames of a scene;
  creating a plurality of foreground masks by performing segmentation on a plurality of current frames of the scene, the segmentation comprising separating foreground objects from background objects using the created background frames;
  extracting the foreground objects by AND-ing the plurality of current frames with the created plurality of foreground masks;
  obtaining a position estimate within the scene for at least one foreground object;
  projecting representations of the created foreground masks for the at least one foreground object; onto a two-dimensional ground plane of the scene, wherein the projecting is clipped by using the obtained position estimate to restrict a distance over which the representations of the created foreground masks are projected, thereby reducing a likelihood of false intersections;
  constructing a three-dimensional depth-box for the at least one foreground object based on an intersection of the projected representations of the foreground masks in the two-dimensional ground plane;
  rendering the at least one foreground object using a depth-box constrained plane sweeping algorithm on the plurality of current frames, wherein a plane sweeping depth range for the at least one foreground object is constrained by the constructed three-dimensional depth-box for the at least one foreground object;
  rendering a view-dependent background image by performing homographic transformations on the created background frames; and
  creating a virtual viewpoint by superimposing the rendered at least one foreground object on the rendered view-dependent background image.

14. The non-transitory computer-readable medium according to claim 13, wherein the functions further comprise calibrating a plurality of cameras using intrinsic and extrinsic calibration techniques, wherein the plurality of cameras are configured to capture a plurality of images, the plurality of images comprising the plurality of current frames and the set of previous frames.

15. The non-transitory computer-readable medium according to claim 13, wherein creating a plurality of foreground masks comprises creating a set of binary or gradient masks, each mask corresponding with a current image, which discriminates the foreground objects from the background.

16. The non-transitory computer-readable medium according to claim 13, wherein constructing the three dimensional depth-box comprises calculating for the at least one foreground object a width, a height, a start depth, and an end depth based at least on the intersection of the projected foreground masks on the ground plane.

* * * * *